(12) United States Patent
Mederer et al.

(10) Patent No.: US 8,838,356 B2
(45) Date of Patent: Sep. 16, 2014

(54) METHOD FOR CONTROLLING A VEHICLE HAVING ONLY A BRAKED REAR AXLE AND BRAKE SLIP CONTROL

(75) Inventors: Martin Mederer, Neumarkt (DE); Andreas Wimmer, Moosburg (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 315 days.

(21) Appl. No.: 13/264,608

(22) PCT Filed: Apr. 16, 2010

(86) PCT No.: PCT/EP2010/002338
§ 371 (c)(1),
(2), (4) Date: Apr. 25, 2012

(87) PCT Pub. No.: WO2010/118877
PCT Pub. Date: Oct. 21, 2010

(65) Prior Publication Data
US 2012/0203439 A1 Aug. 9, 2012

(30) Foreign Application Priority Data
Apr. 17, 2009 (DE) .......................... 10 2009 017 577

(51) Int. Cl.
*B60T 7/12* (2006.01)
*B60T 8/32* (2006.01)
*B60T 8/1769* (2006.01)

(52) U.S. Cl.
CPC ............... *B60T 8/1769* (2013.01); *B60T 8/327* (2013.01); *B60T 2270/12* (2013.01); *B60T 8/322* (2013.01)
USPC .................................. 701/71; 701/74; 701/81

(58) Field of Classification Search
CPC ........ B60T 8/1769; B60T 8/327; B60T 8/322
USPC .......................... 701/69–74, 81; 180/197, 244
See application file for complete search history.

(56) References Cited

U.S. PATENT DOCUMENTS

| 5,012,884 A * | 5/1991 | Sato .............................. 180/244 |
| 5,248,020 A * | 9/1993 | Kreitzberg .................... 180/244 |

FOREIGN PATENT DOCUMENTS

| DE | 36 37 596 | 5/1987 |
| DE | 602 16 661 | 9/2007 |
| EP | 0 112 421 | 7/1984 |
| EP | 0 457 742 | 11/1991 |

OTHER PUBLICATIONS

International Search Report of PCT/EP2010/002338 dated Jul. 27, 2010.

* cited by examiner

*Primary Examiner* — Helal A Algahaim
*Assistant Examiner* — Nga X Nguyen
(74) *Attorney, Agent, or Firm* — Kenyon & Kenyon LLP

(57) ABSTRACT

A method is described for controlling a vehicle having a pressure-medium-activated brake device which includes wheel brakes and brake circuits on each side, on only at least one rear axle, and having a drive engine which drives the rear wheels of the at least one rear axle, in which the rear wheels can be optionally or automatically coupled to or decoupled from front wheels of a front axle in order to transmit driving and/or braking power. Also described is a vehicle having a brake device which includes wheel brakes and brake circuits on each side on only at least one rear axle, and having a drive engine which drives the rear wheels of the at least one rear axle, in which the rear wheels can be optionally or automatically coupled to or decoupled from the front wheels of a front axle in order to transmit driving and/or braking power.

13 Claims, 1 Drawing Sheet

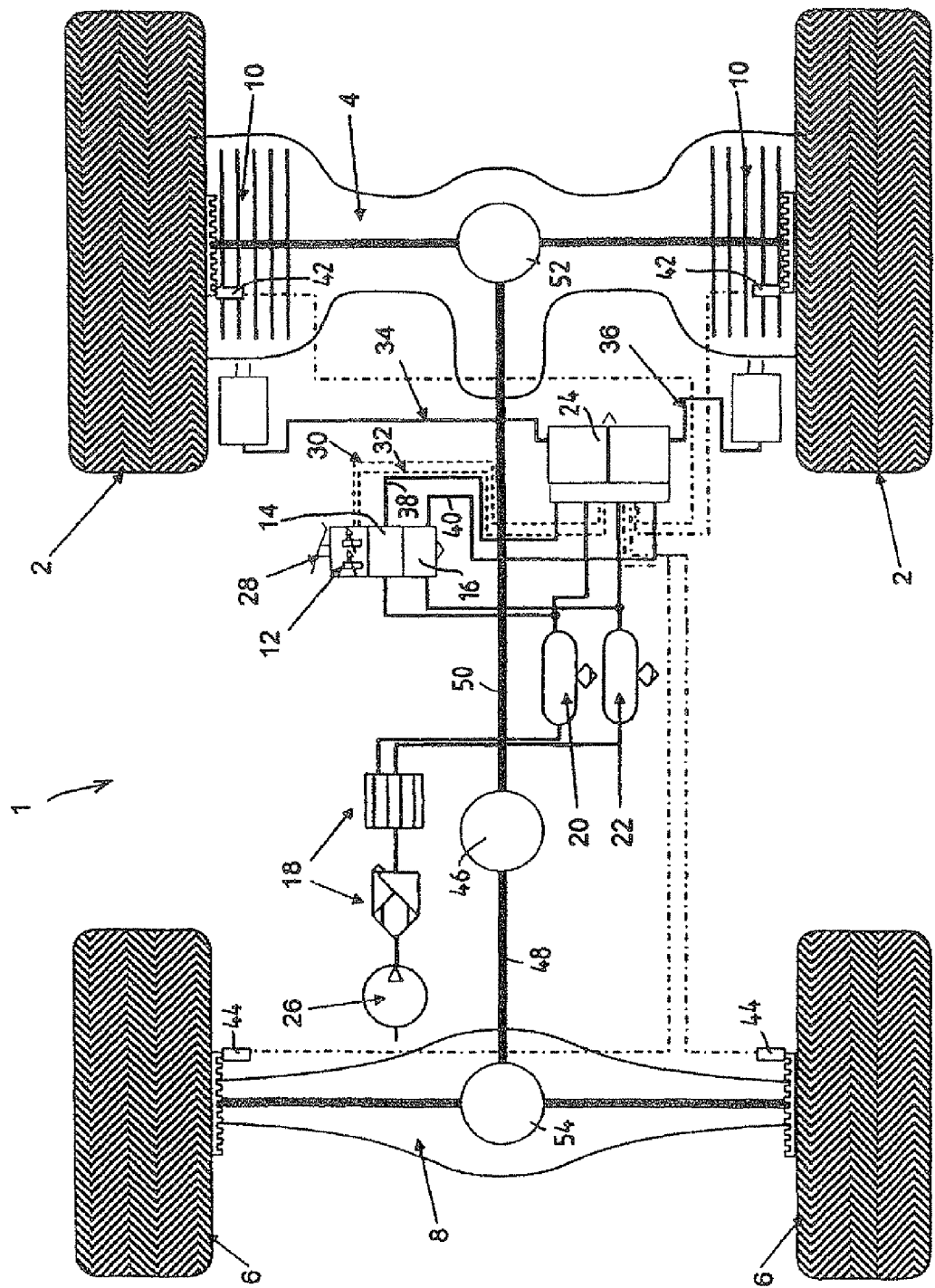

METHOD FOR CONTROLLING A VEHICLE HAVING ONLY A BRAKED REAR AXLE AND BRAKE SLIP CONTROL

FIELD OF THE INVENTION

The present invention relates to a method for controlling a vehicle having a pressure-medium-activated brake device which includes wheel brakes and brake circuits on each side, on only at least one rear axle, and having a drive engine which drives the rear wheels of the at least one rear axle, in which the rear wheels can be optionally or automatically coupled to or decoupled from front wheels of a front axle in order to transmit driving and/or braking power. The present invention also relates to a vehicle having a brake device which includes wheel brakes and brake circuits on each side on only at least one rear axle, and having a drive engine which drives the rear wheels of the at least one rear axle, in which the rear wheels can be optionally or automatically coupled to or decoupled from the front wheels of a front axle in order to transmit driving and/or braking power.

BACKGROUND INFORMATION

Such vehicles may be mainly agricultural utility vehicles or else construction vehicles with front wheels which are not braked by wheel brakes but are instead braked by the clutch along with the rear wheels which are braked by wheel brakes. The coupling between the front wheels and the rear wheels is usually carried out here by a clutch which can be optionally closed manually or else only automatically when braking occurs, which clutch couples the rear axle which is driven by the drive engine to an articulated shaft which then conducts driving power or braking power to the wheels of the front axle.

German patent document DE 602 16 661 T2 discusses agricultural utility vehicles with a brake-slip-controlled brake device of a relatively high equipment level and which, in addition to the rear wheels which are provided with wheel brakes, also have front wheels which are provided with wheel brakes. The document discusses 4S/4M configurations or 4S/3M configurations in which the wheels of the front axle and the wheels of the rear axle are each provided with one wheel speed sensor, and the rear axle is provided with a two-channel brake modulator and the front axle with a two-channel or one-channel brake modulator.

However, such configurations of slip-controlled brake devices are not compatible with vehicles of the generic type such as agricultural utility vehicles (tractors or agricultural tractors) or construction vehicles which have wheel brakes only on the rear axle or the rear axles but not on the front axle. However, since such vehicles nowadays reach ever higher speeds, a high stability level and braking distances which are as short as possible are desirable when braking.

The exemplary embodiments and/or exemplary methods of the present invention are therefore based on the object of developing further a method for controlling a vehicle and a vehicle of the type described at the beginning in such a way that a high level of stability and braking distances which are as short as possible are achieved when braking.

This object is achieved according to the exemplary embodiments and/or exemplary methods of the present invention by the features described herein.

DISCLOSURE OF THE INVENTION

The method according to the present invention provides that the brake device is brake slip controlled, wherein a) if the front wheels are decoupled from the rear wheels, the brake slip at the wheel brakes of the rear axle is controlled individually for each side, or b) if the front wheels are coupled to the rear wheels and α) if no brake slip which differs from an allowed brake slip or from an allowed brake slip range is detected at at least one front wheel, the brake slip at the wheel brakes of the rear axle is controlled individually for each side, or β) if a brake slip which differs from an allowed brake slip or from an allowed brake slip range is detected at all the front wheels, the brake slip at at least one wheel of the rear axle is controlled in such a way that at least one front wheel with the allowed brake slip or with a brake slip within the allowed brake slip range is braked.

With this ABS control strategy it becomes possible even to provide vehicles without wheel brakes on the front axle with an ABS brake device or with a brake slip control. In particular, the present invention has the advantage that when the front wheels are coupled to the rear wheels, the front wheels are also braked with brake slip control and as a result a higher level of stability is achieved at the front axle and relatively short braking distances are achieved when braking compared to the prior art.

The exemplary embodiments and/or exemplary methods of the present invention are therefore based on a vehicle of the generic type whose brake device is brake slip controlled in the way described above and includes an anti-lock brake system which adjusts the brake slip at the wheel brakes of the rear axle to an optimum brake slip. The brake device is of dual circuit design here, with brake circuits on each side on the at least one rear axle. Brake circuits on each side, in relation to the rear axle, means that a separate brake circuit is present for the wheel of the left-hand side and for the wheel of the right-hand side, respectively. This results in a safety margin in the event of failure of a brake circuit.

As a result of the measures specified herein, advantageous developments and improvements of the exemplary embodiments and/or exemplary methods of the present invention disclosed herein are provided.

According to one embodiment of the method, in the case a) the reference speed of the utility vehicle is determined by the signals of the wheel speed sensors which are assigned to the front wheels, in particular by the formation of mean values of the wheel speed signals of the right-hand and left-hand wheels.

The pressure-medium-activated brake device can be a hydraulic, electro-hydraulic, pneumatic, pneumatic-hydraulic or electro-pneumatic brake device.

An electro-pneumatic brake device is understood to be a brake device in which a brake value signal generator generates electrical signals for electro-pneumatic pressure control modules or modulators which generate a brake pressure for pneumatic brake cylinders from a pneumatic supply pressure as a function of these electrical signals. In the case of an electronically controlled brake system (EBS), the brake pressure generated by pressure sensors is also compared with a setpoint brake pressure which is predefined by the brake value signal generator, and the possible control difference is compensated. The brake slip control for each wheel on the rear axle is then subordinate to this brake pressure control.

For wheel-specific brake control at the wheel brakes on each side of the at least one rear axle, for example an ABS pressure control valve or a pressure control module is provided on each side.

Furthermore, in each case at least one wheel speed sensor is assigned to at least one wheel of the at least one rear axle and at least one wheel of the front axle, which wheel speed sensor modulates signals corresponding to the respective wheel speed to an electronic control unit which is designed to determine, on the basis of a reference speed of the vehicle, the actual brake slip at least at the wheels which are provided with wheel speed sensors, and then adjusts the brake slip at least on the wheels which are provided with wheel brakes, as a function of a deviation of the determined actual brake slip from a setpoint brake slip.

Such a configuration with brake circuits on each side with a modulator (M) per side and wheel speed sensors (S) on in each case two wheels of the rear axle and of the front axle then form what is referred to as a 4S/2M configuration. However a 2S/2M or a 3S/2M configuration is also conceivable.

More precise details can be found in the following description of an exemplary embodiment.

An exemplary embodiment of the invention is illustrated in the drawing and explained in more detail in the following description.

BRIEF DESCRIPTION OF THE DRAWING

The FIGURE shows a schematic circuit diagram of a slip-controlled brake device of a vehicle according to an embodiment of the present invention.

DETAILED DESCRIPTION

The pressure-medium-activated, which may be electro-pneumatic, brake device 1 which is shown schematically in the FIGURE serves to perform brake-slip-controlled braking of, for example, an agricultural utility vehicle such as a tractor or agricultural tractor.

Instead of being embodied electro-pneumatically, the brake device 1 can, of course, also be embodied electro-hydraulically or purely pneumatically or purely hydraulically or else pneumatic-hydraulically, with the limitation that in addition to the pneumatic and/or hydraulic components of such a pneumatic, hydraulic or pneumatic-hydraulic brake device 1, electrical or electronic ABS components also have to be present in order to implement brake slip control.

The utility vehicle has a drive engine (not shown here), for example in the form of an internal combustion engine which drives the rear wheels 2 of, for example, a rear axle 4, wherein the rear wheels 2 can be optionally coupled to or decoupled from the front wheels 6 of a front axle 8 in order to transmit driving and braking power. Alternatively, the coupling between the rear wheels 2 and the front wheels 6 can also occur automatically and be triggered by a braking process.

The coupling and decoupling can be carried out, for example, by a hydraulic all-wheel clutch 46 which is actuated, for example, by a solenoid valve as a function of the activation of a brake value signal generator 12, in order to control a flow of pressure medium to or from the hydraulic all-wheel clutch 46.

The all-wheel clutch 46 then automatically couples, for example in the case of braking, an articulated shaft 48, in particular a Cardan shaft to a drive shaft 50 which can be driven by a drive engine and which opens into a rear axle differential 52 of the braked rear axle 4. The articulated shaft 48 is then coupled to the front wheels 6 via a front axle differential 54. Alternatively, the decoupled front wheels 6 can also be coupled to the rear wheels 2 via a clutch which can be operated by the driver.

In other words, for example in driving states differing from braking, the front wheels 6 are then decoupled from the rear wheels 2 and the front wheels 6 are coupled to the rear wheels 6 only in the case of braking, i.e. by initiating a braking process. What is referred to as an all-wheel braking at all the wheels 2, 4 of the vehicle is implemented on this basis.

According to an alternative, the front wheels 6 without wheel brakes could be, on the one hand, at least temporarily driven by coupling to the driven and braked rear wheels 2, and, on the other hand, also braked when the rear wheels 4 are braked. Instead of just one rear axle 4 there can also be a plurality of rear axles present, for example two.

The brake device 1 has wheel brakes 10 here on just the rear axle 4, i.e. there are no wheel brakes present on the front axle 8. However, the front wheels 6 are braked together with the rear wheels 2 which are provided with wheel brakes 10 when the front wheels 6 are coupled to the rear wheels 2 via the closed drive train or brake train, i.e. via the all-wheel clutch and the articulated shaft. Braking of the rear wheels 2 then also causes braking forces to be generated at the front wheels 6.

The brake device 1 is brake slip controlled and therefore contains an anti-lock brake system (ABS) which adjusts the brake slip at the wheel brakes 10 of the rear axle 4 to an optimum brake slip.

The brake device 1 is of dual-circuit design, with brake circuits on each side on the rear axle. Dual circuit means here that a separate channel of a brake value signal generator 12 is respectively provided for each brake circuit, in particular that there is a compressed air supply 20, 22 supplied by an air preprocessing device 18 and an assigned one-channel pressure control module for each side—right, left. Brake circuits on each side means in relation to the rear axle 4 that a separate brake circuit with the specified components is respectively present for the rear wheel 2 of the left-hand side and for the rear wheel 2 of the right-hand side.

The two one-channel pressure control modules for the left-hand side and for the right-hand side can be combined in a single two-channel pressure control module 24, as is apparent from the FIGURE. Consequently, one brake circuit of the brake device 1 is assigned to each side of the rear axle 4—the right-hand-side and the left-hand side, respectively. The air preprocessing device 18 is supplied with compressed air by a compressor 26.

Then, in the case of the electro-pneumatic service brake device 1 which may be used here, electrical signals which respectively represent a setpoint brake pressure are generated by the brake value signal generator 12 as a function of the degree of activation of a foot brake pedal 28 in a channel for the right-hand side and in a channel for the left-hand side. These electrical signals are applied in each brake circuit via separate signal lines 30, 32 to an electronic control unit (not shown explicitly) of the two-channel pressure control module 24 which subsequently generates, separately for each brake circuit, a brake pressure for the wheel brake 10 of the left-hand side and one for the wheel brake 10 of the right-hand side, respectively, in particular via solenoid-controlled inlet valves and outlet valves which actuate an assigned relay valve with a pneumatic control pressure for each channel or brake circuit, which relay valve then modulates a brake pressure from the pneumatic control pressure.

As a pneumatic fall back level, the brake value signal generator 12 also generates, in parallel with the electrical signals, pneumatic control signals for each brake circuit as a function of the degree of activation of the foot brake pedal 28, in a pneumatic channel 14 for the right-hand side and in a pneumatic channel 16 for the left-hand side, and applies said pneumatic control signals to the two-channel pressure control module via pneumatic lines 38, 40 in order to control the pressure control module 24 pneumatically in the event of a failure of the electrics.

The wheel brakes 10 of the rear axle 4 may be formed by pneumatic service brake cylinders which apply the brake when ventilated and release the brake when vented. For the ventilation and venting of the wheel brake cylinders 10, brake pressure lines 34, 36 therefore extend from the respective channel of the two-channel pressure control module 24 to the assigned wheel brake cylinder 10 of the rear axle 4.

Instead of an electrical-pneumatically controlled two-channel pressure control module 24, a purely pneumatically controlled two-channel pressure control module could also be installed in the brake device 1. In this case, the brake value signal generator generates, in particular, a two-channel or two-circuit foot brake valve 12 on the basis of the supplied compressed air of the compressed air supply 20, 22 which is assigned to the respective channel or brake circuit, and modulates, as a function of the degree of activation of the foot pedal 28, just one pneumatic control pressure or input pressure for the respective channel of the two-channel pressure control module 24, which then modulates in each case one brake pressure for the wheel brake cylinders 10 for the two channels or brake circuits.

In the present electronically controlled brake system (EBS), the brake pressures which are generated by the two-channel pressure control module 24 are additionally compared, by integrated pressure sensors, with the setpoint brake pressure which is predefined electrically or pneumatically by the brake value signal generator 12, and possible control differences are compensated. The brake slip control on the wheel brakes 10 of each wheel of the rear axle 4 are then subordinate to such brake pressure control.

Accordingly, the two-channel pressure control module 24 for wheel-specific brake slip control on each side comprises corresponding open-loop or closed-loop control routines in a control unit on the wheel brakes 10 of the rear axle 4. Instead of being arranged in a pressure control module 24, the components which are necessary for pressure control, such as solenoid values, relay valves, electronic control units and pressure sensors, can also be arranged individually and separately from one another as an individuated structure and then connected to one another by corresponding lines.

The rear wheels 2 and the front wheels 6 are each assigned a wheel speed sensor 42, 44 which modulates signals corresponding to the respective wheel speed via electrical signal lines to the electronic control unit of the two-channel pressure control module 24 which may be used here.

The control unit of the two-channel pressure control module 24 is embodied in such a way that on the basis of a reference speed of the vehicle it determines the actual brake slip at the wheels 2, 6 provided with wheel speed sensors 42, 44 and then applies the brake slip at these wheels 2, 6 as a function of a difference between the determined actual brake slip and a setpoint brake slip. Such a configuration with brake circuits on each side with a one-channel pressure control module on each side and wheel speed sensors 42, 44 on the wheels 2 of the rear axle 4 and on those of the front axle 6 then forms what is referred to as a 4S/2M configuration. Alternatively, a 2S/2M configuration or a 3S/2M configuration is also possible, with two or three wheel speed sensors 42, 44 and in each case two modulators (one modulator per side).

In order to determine the reference speed of the vehicle within the scope of the brake slip control (ABS), in addition to the signals of the two or three wheel speed sensors 42, 44, signals of at least one further sensor, such as for example an acceleration sensor or of a sensor which is arranged in the transmission and which measures the rotational speed of an output shaft, are then additionally used. External signals of GPS (Global Positioning System) and radar systems are also conceivable.

The brake pressure is typically subjected to open-loop or closed-loop control in a number of cycles by the routines of the ABS or brake slip control which are integrated into the control unit of the two-channel pressure control module 24, each cycle of which comprises a pressure reduction phase, a pressure holding phase and a pressure increasing phase. By the signals of the wheel speed sensors 42, 44, the control unit then detects whether the wheels 2 of the rear axle 4 or the wheels 6 of the front axle 8 are experiencing unacceptable brake slip, and counteracts this by triggering the cycles described above.

The brake device 1 of the vehicle is, in particular, brake slip controlled by the following method:

If the front wheels 6 are decoupled from the rear wheels 2, then the brake slip at the wheel brakes 10 of the rear axle 4 is controlled individually for each side. Owing to the decoupling of the front wheels 6, not braked separately, from the rear wheels 2, the front wheels 6 are then unbraked.

However, if the front wheels 6 are coupled to the rear wheels 2, two cases are conceivable.

If, on the one hand, no brake slip which differs from an allowed brake slip or from an allowed brake slip range is detected at at least one front wheel 6, the brake slip at the wheel brakes 10 of the rear axle 2 is controlled individually for each side. In this case, the reference speed of the vehicle is determined by the signals of the wheel speed sensors 44 which are assigned to the front wheels 6, in particular by forming the mean values of the wheel speed signals of the right-hand and left-hand wheel 6.

However, if, on the other hand, a brake slip which differs from an allowed brake slip or from an allowed brake slip range is detected at all the front wheels 6, then the brake slip at at least one wheel 2 of the rear axle 4 is controlled in such a way that at least one front wheel 6 with the allowed brake slip or with a brake slip within the allowed brake slip range is braked. An ABS-controlled or brake-slip-controlled braking operation of the at least one front wheel 6 is then brought about by the automatic or optional coupling to the at least one brake-slip-controlled rear wheel 2.

In this way, a vehicle can also be operated with wheel brakes 10 only on the rear axle 4, with an ABS control which also acts on the front wheels 6. Of course, the brake slip control can, instead of being controlled by a two-channel pressure control module 24, also be implemented by other control valves such as, for example, ABS pressure control valves for each wheel 2 or for each side of the rear axle 4.

LIST OF REFERENCE NUMBERS

1 Brake device
2 Rear wheels
4 Rear axle
6 Front wheels
8 Front axle
10 Wheel brakes
12 Brake value signal generator
14 Channel
16 Channel
18 Air preprocessing device
20 Compressed air supply
22 Compressed air supply
24 two-channel pressure control module
26 Compressor
28 Foot brake pedal 30 Signal line
32 Signal line
34 Brake pressure line
36 Brake pressure line
38 Pneumatic line
40 Pneumatic line
42 Wheel speed sensor
44 Wheel speed sensor
46 All-wheel clutch
48 Articulated shaft
50 Drive shaft
52 Rear axle differential
54 Front axle differential The invention claims is:

1. A method for controlling a vehicle having a pressure-medium-actuated brake device, which includes wheel brakes and brake circuits on each side, on only at least one rear axle, and having a drive engine which drives the rear wheels of the at least one rear axle, the rear wheels being optionally or automatically coupled to or decoupled from front wheels of a front axle to transmit at least one of driving power and braking power, and the brake device being brake slip controlled, the method comprising:
performing, sing a control unit, one of the following:
if the front wheels are decoupled from the rear wheels, controlling, via the control unit, individually for each side a brake slip at the wheel brakes of the rear axle,
if the front wheels are coupled to the rear wheels and if no brake slip, which differs from an allowed brake slip or from an allowed brake slip range, is detected at at least one front wheel, controlling, via the control unit, individually for each side the brake slip at the wheel brakes of the rear axle, and
if the front wheels are coupled to the rear wheels and if a brake slip, which differs from an allowed brake slip or from the allowed brake slip range, is detected at all the front wheels, controlling, via the control unit, the brake slip at at least one wheel of the rear axle so that at least one front wheel with the allowed brake slip or with a brake slip within the allowed brake slip range is braked;
wherein for each of the prior conditions, including: (i) if the front wheels are decoupled from the rear wheels, (ii) if the front wheels are coupled to the rear wheels and if no brake slip, which differs from an allowed brake slip or from the allowed brake slip range, is detected at at least one front wheel, and (iii) if the front wheels are coupled to the rear wheels and if a brake slip, which differs from the allowed brake slip or from the allowed brake slip range, is detected at all the front wheels, the control unit is configured to perform, depending on the condition, each of the following: (a) control individually for each side the brake slip at the wheel brakes of the rear axle, (b) control individually for each side the brake slip at the wheel brakes of the rear axle, and (c) control the brake slip at the at least one wheel of the rear axle so that at least one front wheel with the allowed brake slip or with the brake slip within the allowed brake slip range is braked.

2. The method of claim 1, wherein the reference speed of the vehicle is determined, via the control unit, by signals of the wheel speed sensors, which are assigned to the front wheels, by forming mean values of the wheel speed signals of the right-hand and left-hand wheels.

3. A vehicle, comprising:
a brake device having wheel brakes and brake circuits on each side on only at least one rear axle,
a drive engine, which drives the rear wheels of the at least one rear axle, wherein the rear wheels can be optionally or automatically coupled to or decoupled from front wheels of a front axle to transmit at least one of driving power and braking power;
wherein the brake device includes a control arrangement to perform one of the following:
if the front wheels are decoupled from the rear wheels, control individually for each side a brake slip at the wheel brakes of the rear axle,
if the front wheels are coupled to the rear wheels and if no brake slip, which differs from an allowed brake slip or from an allowed brake slip range, is detected at at least one front wheel, control individually for each side the brake slip at the wheel brakes of the rear axle, and
if the front wheels are coupled to the rear wheels and if a brake slip, which differs from an allowed brake slip or from the allowed brake slip range, is detected at all the front wheels, control the brake slip at at least one wheel of the rear axle so that at least one front wheel with the allowed brake slip or with a brake slip within the allowed brake slip range is braked;
wherein for each of the prior conditions, including: (i) if the front wheels are decoupled from the rear wheels, (ii) if the front wheels are coupled to the rear wheels and if no brake slip, which differs from an allowed brake slip or from the allowed brake slip range, is detected at at least one front wheel, and (iii) if the front wheels are coupled to the rear wheels and if a brake slip, which differs from the allowed brake slip or from the allowed brake slip range, is detected at all the front wheels, the control arrangement is configured to perform, depending on the condition, each of the following: (a) control individually for each side the brake slip at the wheel brakes of the rear axle, (b) control individually for each side the brake slip at the wheel brakes of the rear axle, and (c) control the brake slip at the at least one wheel of the rear axle so that at least one front wheel with the allowed brake slip or with the brake slip within the allowed brake slip range is braked.

4. The vehicle of claim 3, wherein the brake device includes one of a hydraulic, electro-hydraulic, pneumatic, pneumatic-hydraulic and electro-pneumatic brake device.

5. The vehicle of claim 4, wherein to perform wheel-specific brake slip control on each side, there is one of an ABS pressure control valve and a pressure control valve module on each side on the wheel brakes of the at least one rear axle.

6. The vehicle of claim 5, wherein in each case, at least one wheel speed sensor is assigned to at least one wheel of the at least one rear axle and at least one wheel of the front axle, which wheel speed sensor modulates signals corresponding to the respective wheel speed to an electronic control unit which is configured to determine, based on a reference speed of the vehicle, the actual brake slip at least at the wheels which are provided with wheel speed sensors, and which then adjusts the brake slip at least on the wheels which are provided with wheel brakes, as a function of a deviation of the determined actual brake slip from a setpoint brake slip.

7. The vehicle of claim 5, wherein the brake device has one of a 2S/2M- configuration, a 3S/2M- configuration, and a 4S/2M-configuration.

8. The vehicle of claim 3, wherein the front wheels are coupled to the rear wheels by an all-wheel clutch, which is actuated as a function of the degree of activation of a brake value signal generator.

9. The method of claim 1, wherein the brake device includes one of a hydraulic, electro-hydraulic, pneumatic, pneumatic-hydraulic and electro-pneumatic brake device.

10. The vehicle of claim 9, wherein to perform wheel-specific brake slip control on each side, there is one of an ABS pressure control valve and a pressure control valve module on each side on the wheel brakes of the at least one rear axle.

11. The vehicle of claim 10, wherein in each case, at least one wheel speed sensor is assigned to at least one wheel of the at least one rear axle and at least one wheel of the front axle, which wheel speed sensor modulates signals corresponding to the respective wheel speed to an electronic control unit which is configured to determine, based on a reference speed of the vehicle, the actual brake slip at least at the wheels which are provided with wheel speed sensors, and which then adjusts the brake slip at least on the wheels which are provided with wheel brakes, as a function of a deviation of the determined actual brake slip from a setpoint brake slip.

12. The vehicle of claim 10, wherein the brake device has one of a 2S/2M-configuration, a 3S/2M-configuration, and a 4S/2M-configuration.

13. The vehicle of claim 1, wherein the front wheels are coupled to the rear wheels by an all-wheel clutch, which is actuated as a function of the degree of activation of a brake value signal generator.

* * * * *